(12) United States Patent
Lastusaari et al.

(10) Patent No.: US 11,767,470 B2
(45) Date of Patent: Sep. 26, 2023

(54) LIGHTING DEVICE

(71) Applicant: Turun Yliopisto, Turun Yliopisto (FI)

(72) Inventors: Mika Lastusaari, Turku (FI); Isabella Norrbo, Turku (FI)

(73) Assignee: TURUN YLIOPISTO, Turun Yliopisto (FI)

( * ) Notice: Subject to any disclaimer, the term of this patent is extended or adjusted under 35 U.S.C. 154(b) by 217 days.

(21) Appl. No.: 17/433,535

(22) PCT Filed: Feb. 17, 2020

(86) PCT No.: PCT/FI2020/050096
§ 371 (c)(1),
(2) Date: Aug. 24, 2021

(87) PCT Pub. No.: WO2020/174124
PCT Pub. Date: Sep. 3, 2020

(65) Prior Publication Data
US 2022/0195296 A1   Jun. 23, 2022

(30) Foreign Application Priority Data

Feb. 26, 2019 (FI) .................................. 20195144

(51) Int. Cl.
*F21V 9/30*       (2018.01)
*C09K 11/67*      (2006.01)
*C09K 11/77*      (2006.01)

(52) U.S. Cl.
CPC ...... *C09K 11/676* (2013.01); *C09K 11/77344* (2021.01); *C09K 11/77744* (2021.01); *F21V 9/30* (2018.02)

(58) Field of Classification Search
CPC  F21V 9/30; F21V 9/40; C09K 11/676; C09K 11/77744; C09K 11/77344
(Continued)

(56) References Cited

U.S. PATENT DOCUMENTS 8,760,074 B2 *   6/2014   Raj .................. H05B 45/22
                                                315/153
9,609,715 B1     3/2017   Petluri
(Continued)

FOREIGN PATENT DOCUMENTS

TW    200919770 A    5/2009
WO    2017194825 A1  11/2017

OTHER PUBLICATIONS

International Search Report and Written Opinion dated May 7, 2020 for corresponding International Application No. PCT/FI2020/050096.

(Continued)

*Primary Examiner* — Christopher M Raabe
(74) *Attorney, Agent, or Firm* — TAROLLI, SUNDHEIM, COVELL & TUMMINO LLP

(57) ABSTRACT

A lighting device for adjusting the color temperature of white light emitted by a luminescent material is disclosed. The lighting device comprises: a luminescent material configured to emit white light when being exposed to electromagnetic radiation of a preselected wavelength range; at least one excitation unit configured to expose the luminescent material to electromagnetic radiation of a first wavelength range selected from the range of 230-330 nm; at least one excitation unit configured to expose the luminescent material to electromagnetic radiation of a second wavelength range, different from the first wavelength range, selected from the range of 300-600 nm; a metering unit configured to adjust the ratio of the irradiances of electromagnetic radiation of first wavelength range and of electromagnetic radiation of second wavelength range that is exposed on the luminescent material.

12 Claims, 3 Drawing Sheets

(58) Field of Classification Search
USPC .......................................................... 362/84
See application file for complete search history.

(56) References Cited

U.S. PATENT DOCUMENTS

| | | |
|---|---|---|
| 2006/0152140 A1 | 7/2006 | Brandes |
| 2009/0224652 A1 | 9/2009 | Li |
| 2019/0153314 A1* | 5/2019 | Lastusaari ............. G01T 1/1606 |
| 2020/0318003 A1* | 10/2020 | Lastusaari ................. G01T 1/06 |
| 2022/0210881 A1* | 6/2022 | Lee ....................... H01L 33/504 |

OTHER PUBLICATIONS

Norrbo, I., et al. (2017). "Lanthanide and Heavy Metal Free Long White Persistent Luminescence from Ti Doped Li-Hackmanite: A Versatile, Low-Cost Material", Advanced Functional Materials, 27(17), 1606547. doi:10.1002/adfm.201606547.

Norrbo, I., et al. (2016). "Mechanisms of Tenebrescence and Persistent Luminescence in Synthetic Hackmanite Na 8 Al 6 Si 6 O 24 (Cl,S) 2", ACS Applied Materials & Interfaces, 8(18), 11592-11602. doi:10.1021/acsami.6b01959.

Norrbo, I., et al. (2015). "Persistent Luminescence of Tenebrescent Na 8 Al 6 Si 6 O 24 (Cl,S) 2: Multifunctional Optical Markers", Inorganic Chemistry, 54(16), 7717-7724. doi:10.1021/acs.inorgchem.5b00568.

Finnish Search Report dated Sep. 26, 2019 for FI Patent Application No. 20195144.

* cited by examiner

LIGHTING DEVICE

RELATED APPLICATIONS

The present application is a U.S. National Stage application under 35 USC 371 of PCT Application Serial No. PCT/FI2020/050096, filed on 17 Feb. 2020, claiming priority to Finnish Application Serial No. 20195144, filed on 26 Feb. 2019, the entirety of each of which are incorporated herein by reference.

TECHNICAL FIELD

The present disclosure relates to a lighting device for adjusting the color temperature of white light emitted by a luminescent material. The present disclosure further relates to a method for adjusting the color temperature of white light emitted by a luminescent material.

BACKGROUND

For lighting building interiors, it is often important to take into account the color temperature of illumination. A warmer, i.e. a lower color temperature, light is often used in public areas to promote relaxation, while a cooler, higher color temperature, light is used to enhance concentration, for example in schools and offices. There are different manners available to adjust the color temperature of light. Current white light emitting diode (LED) lighting devices with adjustable color temperature use a combination of separate red, green and blue LEDs to construct the white light. Thus, such lamps contain separate red, green and blue dots that are clearly visible for the human eye. The inventors have recognized the need to construct a lighting device e.g. a bulb that would have a white appearance all over instead of having spots of different colors.

SUMMARY

A lighting device for adjusting the color temperature of white light emitted by a luminescent material is disclosed. The lighting device may comprise: a luminescent material configured to emit white light when being exposed to electromagnetic radiation of a preselected wavelength range; at least one excitation unit configured to expose the luminescent material to electromagnetic radiation of a first wavelength range selected from the range of 230-330 nm; at least one excitation unit configured to expose the luminescent material to electromagnetic radiation of a second wavelength range, different from the first wavelength range, selected from the range of 300-600 nm; and a metering unit configured to adjust the ratio of the irradiances of electromagnetic radiation of first wavelength range and of electromagnetic radiation of second wavelength range that is exposed on the luminescent material for adjusting the color temperature of white light emitted by the luminescent material as a result of being subjected to the electromagnetic radiation of the preselected wavelength range. The luminescent material is represented by the following formula (I)

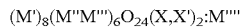

$$(M')_8(M''M'''')_6O_{24}(X,X')_2:M'''' \quad \text{formula (I)}$$

wherein

M' represents a monoatomic cation of an alkali metal selected from Group 1 of the IUPAC periodic table of the elements, or any combination of such cations;

M'' represents a trivalent monoatomic cation of an element selected from Group 13 of the IUPAC periodic table of the elements, or of a transition element selected from any of Groups 3-12 of the IUPAC periodic table of the elements, or any combination of such cations;

M''' represents a monoatomic cation of an element selected from Group 14 of the IUPAC periodic table of the elements, or of an element selected from any of Groups 13 and 15 of the IUPAC periodic table of the elements, or of Zn, or any combination of such cations;

X represents an anion of an element selected from Group 17 of the IUPAC periodic table of the elements, or any combination of such anions, or wherein X is absent;

X' represents an anion of an element selected from Group 16 of the IUPAC periodic table of the elements, or any combination of such anions, or wherein X' is absent; and M'''' represents a dopant cation of an element selected from transition metals of the IUPAC periodic table of the elements, or of Tl, Pb, or Bi, or any combination of such cations, or wherein M'''' is absent;

with the proviso that at least one of X and X' is present.

Further is disclosed a method for adjusting the color temperature of white light emitted by a luminescent material. The method may comprise: providing a luminescent material represented by the formula (I) as defined in the present disclosure; subjecting the luminescent material to electromagnetic radiation with at least one excitation unit (3a) exposing the luminescent material to electromagnetic radiation of a first wavelength range selected from the range of 230-330 nm, and with at least one excitation unit (3b) exposing the luminescent material to electromagnetic radiation of a second wavelength range, different from the first wavelength range, selected from the range of 300-600 nm, wherein the ratio of the irradiances of electromagnetic radiation of first wavelength range and of electromagnetic radiation of second wavelength range that is exposed on the luminescent material is adjusted for adjusting the color temperature of white light emitted by the luminescent material as a result of being subjected to the electromagnetic radiation of the preselected wavelength range.

BRIEF DESCRIPTION OF THE DRAWINGS

The accompanying drawings, which are included to provide a further understanding of the embodiments and constitute a part of this specification, illustrate embodiments and together with the description help to explain the principles of the above. In the drawings.

DETAILED DESCRIPTION

Figure 1:
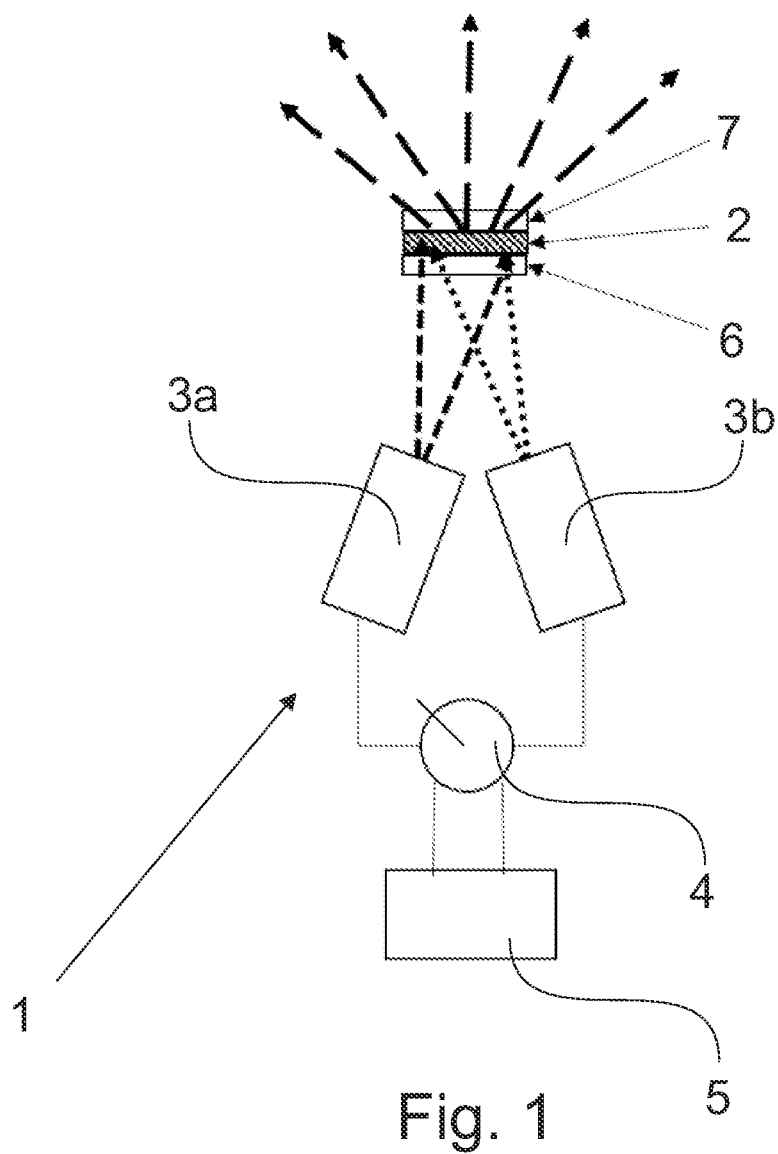
FIG. 1 schematically illustrates one embodiment of the lighting device.

The present disclosure relates to a lighting device for adjusting the color temperature of white light emitted by a luminescent material, wherein the lighting device comprises:

a luminescent material configured to emit white light when being exposed to electromagnetic radiation of a preselected wavelength range;

at least one excitation unit configured to expose the luminescent material to electromagnetic radiation of a first wavelength range selected from the range of 230-330 nm;

at least one excitation unit configured to expose the luminescent material to electromagnetic radiation of a second wavelength range, different from the first wavelength range, selected from the range of 300-600 nm;

a metering unit configured to adjust the ratio of the irradiances of electromagnetic radiation of first wavelength range and of electromagnetic radiation of second wavelength range that is exposed on the luminescent material for adjusting the color temperature of white light emitted by the luminescent material as a result of being subjected to the electromagnetic radiation of the preselected wavelength range;

wherein the luminescent material is represented by the following formula (I)

$$(M')_8(M''M''')_6O_{24}(X,X')_2:M'''' \qquad \text{formula (I)}$$

wherein

M' represents a monoatomic cation of an alkali metal selected from Group 1 of the IUPAC periodic table of the elements, or any combination of such cations;

M'' represents a trivalent monoatomic cation of an element selected from Group 13 of the IUPAC periodic table of the elements, or of a transition element selected from any of Groups 3-12 of the IUPAC periodic table of the elements, or any combination of such cations;

M''' represents a monoatomic cation of an element selected from Group 14 of the IUPAC periodic table of the elements, or of an element selected from any of Groups 13 and 15 of the IUPAC periodic table of the elements, or of Zn, or any combination of such cations;

X represents an anion of an element selected from Group 17 of the IUPAC periodic table of the elements, or any combination of such anions, or wherein X is absent;

X' represents an anion of an element selected from Group 16 of the IUPAC periodic table of the elements, or any combination of such anions, or wherein X' is absent; and M'''' represents a dopant cation of an element selected from transition metals of the IUPAC periodic table of the elements, or of Tl, Pb, or Bi, or any combination of such cations, or wherein M'''' is absent;

with the proviso that at least one of X and X' is present.

The present disclosure further relates to a method for adjusting the color temperature of white light emitted by a luminescent material, wherein the method comprises:
providing a luminescent material represented by the formula (I) as defined in the present disclosure;
subjecting the luminescent material to electromagnetic radiation with at least one excitation unit (3a) exposing the luminescent material to electromagnetic radiation of a first wavelength range selected from the range of 230-330 nm, and with at least one excitation unit (3b) exposing the luminescent material to electromagnetic radiation of a second wavelength range, different from the first wavelength range, selected from the range of 300-600 nm,
wherein the ratio of the irradiances of electromagnetic radiation of first wavelength range and of electromagnetic radiation of second wavelength range that is exposed on the luminescent material is adjusted for adjusting the color temperature of white light emitted by the luminescent material as a result of being subjected to the electromagnetic radiation of the preselected wavelength range.

In one embodiment, the method comprises exposing the luminescent material to electromagnetic radiation of a first wavelength range selected from the range of 230-330 nm and to electromagnetic radiation of a second wavelength range, different from the first wavelength range, selected from the range of 300-600 nm.

In one embodiment, the lighting device is used in a mobile device such as a mobile phone, in a display, in a head-up display (HUD), in a liquid crystal display (LCD), in a window display, as a roading light, as a house lighting, or as a decorative element. In one embodiment, the lighting device is used as a light emitting diode (LED), or a microLED. In one embodiment, the lighting device is used in a light emitting diode (LED), an organic light-emitting diode (OLED), an active-matrix organic light emitting diode (AMOLED), or a microLED. In one embodiment, the lighting device is used as a component in a fluorescent tube, a light emitting diode (LED), an organic light-emitting diode (OLED), an active-matrix organic light emitting diode (AMOLED), or a microLED. In one embodiment, the lighting device is used as a frontlight, as a backlight, as a photoconductor, as a lighting guide, as a fiber conductor, as a ringlight, or as a head-light, or as a fluorescent tube. In one embodiment, the lighting device is flexible and/or bendable.

The term "the electromagnetic radiation of a preselected wavelength range" may refer to such electromagnetic radiation that when being exposed on the luminescent material, will results in the luminescent material emitting white light. In one embodiment, the luminescent material emits white light when being exposed to electromagnetic radiation having a first wavelength range selected from the range of 230-330 nm. In one embodiment, the color temperature of the white light emitted by the luminescent material is adjusted when additionally exposing the luminescent material to electromagnetic radiation having a second wavelength range selected from the range of 300-600 nm, e.g. 330-600 nm, and being different from the first wavelength range.

Electromagnetic radiation with a wavelength between 380 nm and 760 nm (400-790 terahertz) is detected by the human eye and perceived as visible light. White light is a combination of lights of different wavelengths in the visible spectrum. The inventors surprisingly found out that it is possible to adjust the color temperature of white light emitted by the luminescent material when exposing the material to electromagnetic radiation of two different wavelength ranges. I.e. the inventors found out that the color temperature of white light emitted by the luminescent material could be adjusted from a cool white color to a warm white color. The color temperature is a measureable characteristic of visible light, such as sunlight or the light from a lighting device, such as a lamp. The color temperature of a lighting device is the temperature of an ideal black-body radiator that radiates light of a color comparable to that of the light source. The color temperature is expressed in Kelvin (K).

In one embodiment, the color temperature of white light emitted by the luminescent material is adjusted within the range of 2000-13000 K, or 2400-12500 K.

In one embodiment, the difference between the first wavelength range and the second wavelength range is at least 20 nm, or at least 50 nm, or at least 100 nm. In one embodiment, the difference between the first wavelength range and the second wavelength range is at most 30 nm, or at most 70 nm, or at most 100 nm, or at most 150 nm, or at most 200 nm, or at most 250 nm, or at most 300 nm, or at most 350 nm.

In one embodiment, the electromagnetic radiation of the first wavelength range is selected from the range of 260-320 nm, or 280-310 nm, or 290-300 nm.

In one embodiment, the electromagnetic radiation of the second wavelength range is selected from the range of 330-400 nm, or 360-380 nm.

In one embodiment, the metering unit is configured to adjust the ratio of the irradiances of electromagnetic radiation of first wavelength range and of electromagnetic radiation of second wavelength range that is exposed on the luminescent material by adjusting the amount of electric current fed to the at least one excitation unit configured to expose the luminescent material to electromagnetic radiation of a first wavelength range and to the at least one excitation unit configured to expose the luminescent material to electromagnetic radiation of a second wavelength range.

In one embodiment, the ratio of the irradiances of electromagnetic radiation of first wavelength range and of electromagnetic radiation of second wavelength range can range from zero to infinity.

In one embodiment, the lighting device comprises one excitation unit configured to expose the luminescent material to electromagnetic radiation of a first wavelength range selected from the range of 230-330 nm. In one embodiment, the lighting device comprises one excitation unit configured to expose the luminescent material to electromagnetic radiation of a second wavelength range, different from the first wavelength range, selected from the range of 300-600 nm.

In one embodiment, the lighting device comprises two or more excitation units configured to expose the luminescent material to electromagnetic radiation of a first wavelength range selected from the range of 230-330 nm. In one embodiment, the lighting device comprises two or more excitation units configured to expose the luminescent material to electromagnetic radiation of a second wavelength range, different from the first wavelength range, selected from the range of 300-600 nm.

In one embodiment, the lighting device comprises two or more excitation units configured to expose the luminescent material to electromagnetic radiation of a first wavelength range selected from the range of 230-330 nm, wherein each of the two or more excitation units is being configured to expose the luminescent material to electromagnetic radiation of a different wavelength range than the other excitation units. I.e. the two or more excitation units configured to expose the luminescent material to electromagnetic radiation of a first wavelength range can be configured to expose the luminescent material to different wavelength ranges selected from the range of 230-330 nm.

In one embodiment, the lighting device comprises two or more excitation units configured to expose the luminescent material to electromagnetic radiation of a second wavelength range, different from the first wavelength range, selected from the range of 300-600 nm, wherein each of the two or more excitation units is being configured to expose the luminescent material to electromagnetic radiation of a different wavelength range than the other excitation units. I.e. the two or more excitation units configured to expose the luminescent material to electromagnetic radiation of a second wavelength range, different from the first wavelength range, can be configured to expose the luminescent material to different wavelength ranges selected from the range of 300-600 nm.

In one embodiment, the lighting device comprises at least one excitation unit configured to expose the luminescent material to electromagnetic radiation of a wavelength range selected from a range outside 230-600 nm.

In one embodiment, the excitation unit is an ultraviolet (UV) radiation source, a light emitting diode (LED), an organic light-emitting diode (OLED), an active-matrix organic light emitting diode (AMOLED), a mercury-vapor lamp, a mercury-based lamp, a microLED, a gas discharge lamp, a fluorescent lamp, an incandescent lamp, a halogen lamp, a filament light, laser light or any combination thereof.

In one embodiment, the method comprises adjusting the ratio of the irradiances of electromagnetic radiation of first wavelength range and of electromagnetic radiation of second wavelength range that is exposed on the luminescent material by adjusting the amount of electric current fed to the at least one excitation unit configured to expose the luminescent material to electromagnetic radiation of a first wavelength range and to the at least one excitation unit configured to expose the luminescent material to electromagnetic radiation of a second wavelength range.

In one embodiment, the metering unit is any device or system that is able to adjust the amount of electric current fed to the at least one excitation unit configured to expose the luminescent material to electromagnetic radiation of a first wavelength range and/or to the at least one excitation unit configured to expose the luminescent material to electromagnetic radiation of a second wavelength range. In one embodiment, the metering unit is able to adjust the ratio of electric current fed to the at least one excitation unit configured to expose the luminescent material to electromagnetic radiation of a first wavelength range and/or to the at least one excitation unit configured to expose the luminescent material to electromagnetic radiation of a second wavelength range. In one embodiment, the metering unit is an adjustable power source.

In one embodiment, the lighting device comprises a power unit for producing and/or entering electric current to the metering unit.

In one embodiment, the lighting device comprises a blocking material preventing or inhibiting the electromagnetic radiation exposed on the luminescent material from being transferred to the surrounding from the lighting device. In one embodiment, the blocking material is a material blocking ultraviolet radiation from being transferred to the surrounding from the lighting device. In one embodiment, the blocking material is situated on the opposite side of the luminescent material compared to the side of the luminescent material that is exposed to the electromagnetic radiation from the excitation units.

In one embodiment, the lighting device comprises a transparent material. In one embodiment, the transparent material is situated on the side of the luminescent material that is exposed to the electromagnetic radiation. In one embodiment, the electromagnetic radiation of the first wavelength range and/or the electromagnetic radiation of the second wavelength range are/is transferred through the transparent material before being exposed on the luminescent material.

In one embodiment, the electromagnetic radiation of a preselected wavelength range to which the luminescent material is exposed to is ultraviolet radiation. Ultraviolet light or ultraviolet radiation is electromagnetic radiation with a wavelength from 10 nm (30 PHz) to 400 nm (750 THz). The electromagnetic spectrum of ultraviolet radiation (UVR) can be subdivided into a number of ranges recommended by the ISO standard ISO-21348, including ultraviolet A (UVA), ultraviolet B (UVB), ultraviolet C (UVC). The wavelength of UVA is generally considered to be 315-400 nm, the wavelength of UVB is generally considered to be 280-320 and the wavelength of UVC is generally considered to be 100-290 nm.

In one embodiment, M' represents a monoatomic cation of an alkali metal selected from a group consisting of Na, Li, K, and Rb, or any combination of such cations. In one embodiment, M' represents a monoatomic cation of an alkali metal selected from a group consisting of Li, K, and Rb, or any combination of such cations.

In one embodiment, M' represents a monoatomic cation of an alkali metal selected from Group 1 of the IUPAC periodic table of the elements, or any combination of such cations; with the proviso that M' does not represent the monoatomic cation of Na alone. In one embodiment, M' does not represent the monoatomic cation of Na alone.

In one embodiment, the luminescent material is a synthetic material. In one embodiment, the luminescent material is synthetically prepared.

The proviso that at least one of X and X' is present should in this specification, unless otherwise stated, be understood such that either X or X' is present, or such that both X and X' are present.

In this specification, unless otherwise stated, the expression "monoatomic ion" should be understood as an ion consisting of a single atom. If an ion contains more than one atom, even if these atoms are of the same element, it is to be understood as a poly-atomic ion. Thus, in this specification, unless otherwise stated, the expression "monoatomic cation" should be understood as a cation consisting of a single atom.

Hackmanite, which is a variety of sodalite material, is natural mineral having the chemical formula of $Na_8Al_6Si_6O_{24}(Cl, S)_2$. A synthetic hackmanite based material can be prepared. The luminescent material represented by formula (I), as a result of being exposed to e.g. ultraviolet radiation, has the technical effect of emitting white light. The expression "luminescent" may in this specification, unless otherwise stated, refer to the property of the material to being able to emit light without being heated.

In one embodiment, M' represents a combination of at least two monoatomic cations of different alkali metals selected from Group 1 of the IUPAC periodic table of the elements.

In one embodiment, M' represents a combination of at least two monoatomic cations of different alkali metals selected from Group 1 of the IUPAC periodic table of the elements, and wherein the combination comprises at most 66 mole percent (mol-%) of the monoatomic cation of Na. In one embodiment, M' represents a combination of at least two monoatomic cations of different alkali metals selected from Group 1 of the IUPAC periodic table of the elements, and wherein the combination comprises at most 50 mol-% of the monoatomic cation of Na. In one embodiment, M' represents a combination of at least two monoatomic cations of different alkali metals selected from Group 1 of the IUPAC periodic table of the elements, and wherein the combination comprises at most 40 mol-% of the monoatomic cation of Na, or at most 30 mol-% of the monoatomic cation of Na, or at most 20 mol-% of the monoatomic cation of Na.

In one embodiment, M' represents a combination of at least two monoatomic cations of different alkali metals selected from Group 1 of the IUPAC periodic table of the elements, wherein the combination comprises 0-98 mol-% of the monoatomic cation of Na.

In one embodiment, M' represents a combination of at least two monoatomic cations of different alkali metals selected from Group 1 of the IUPAC periodic table of the elements, wherein the combination comprises 0-99.99 mol-% of the monoatomic cation of K. In one embodiment, M' represents a combination of at least two monoatomic cations of different alkali metals selected from Group 1 of the IUPAC periodic table of the elements, and wherein the combination comprises at most 40 mol-% of the monoatomic cation of K, or at most 30 mol-% of the monoatomic cation of K, or at most 20 mol-% of the monoatomic cation of K.

In one embodiment, M' represents a combination of at least two monoatomic cations of different alkali metals selected from Group 1 of the IUPAC periodic table of the elements, wherein the combination comprises 0-99.99 mol-% of the monoatomic cation of Rb. In one embodiment, M' represents a combination of at least two monoatomic cations of different alkali metals selected from Group 1 of the IUPAC periodic table of the elements, and wherein the combination comprises at most 40 mol-% of the monoatomic cation of Rb, or at most 30 mol-% of the monoatomic cation of Rb, or at most 20 mol-% of the monoatomic cation of Rb.

In one embodiment, M' represents a combination of at least two monoatomic cations of different alkali metals selected from Group 1 of the IUPAC periodic table of the elements, wherein the combination comprises 0-99.99 mol-% of the monoatomic cation of Li. In one embodiment, M' represents a combination of at least two monoatomic cations of different alkali metals selected from Group 1 of the IUPAC periodic table of the elements, and wherein the combination comprises at most 40 mol-% of the monoatomic cation of Li, or at most 30 mol-% of the monoatomic cation of Li, or at most 20 mol-% of the monoatomic cation of Li.

In one embodiment, M' represents a combination of at least two monoatomic cations of different alkali metals selected from a group consisting of Li, Na, K, and Rb. In one embodiment, M' represents a combination of two monoatomic cations of different alkali metals selected from a group consisting of Li, Na, K, and Rb. In one embodiment, M' represents a combination of three monoatomic cations of different alkali metals selected from a group consisting of Li, Na, K, and Rb. In one embodiment, M' represents a combination of monoatomic cations of Li, Na, K, and Rb.

In one embodiment, M' represents a combination of a monoatomic cation of Na with a monoatomic cation of Li, a monoatomic cation of K and/or a monoatomic cation of Rb. In one embodiment, M' represents a combination of a monoatomic cation of Na with a monoatomic cation of K or a monoatomic cation of Rb. In one embodiment, M' represents a combination of a monoatomic cation of Na with a monoatomic cation of K and a monoatomic cation of Rb.

In one embodiment, M' represents a combination of a monoatomic cation of Na and a monoatomic cation of K; or a combination of a monoatomic cation of Na and a monoatomic cation of Rb; or a combination of a monoatomic cation of K and a monoatomic cation of Rb; or a combination of a monoatomic cation of Na, a monoatomic cation of K, and a monoatomic cation of Rb; or a combination of a monoatomic cation of K and a monoatomic cation of Rb.

In one embodiment, M' represents a combination of a monoatomic cation of Li and a monoatomic cation of Na; or a combination of a monoatomic cation of Li and a monoatomic cation of K; or a combination of a monoatomic cation of Li and a monoatomic cation of Rb; or a combination of a monoatomic cation of Li, a monoatomic cation of K, and a monoatomic cation of Rb; or a combination of a monoatomic cation of Li, a monoatomic cation of Na, a monoatomic cation of K and a monoatomic cation of Rb.

In one embodiment, M' represents a monoatomic cation of Li. In one embodiment, M' represents a monoatomic cation of K. In one embodiment, M' represents a monoatomic cation of Rb.

In one embodiment, M" represents a trivalent monoatomic cation of a metal selected from a group consisting of Al and Ga, or a combination of such cations.

In one embodiment, M" represents a trivalent monoatomic cation of B.

In one embodiment, M'' represents a trivalent monoatomic cation of an element selected from a group consisting of Cr, Mn, Fe, Co, Ni, and Zn, or any combination of such cations.

In one embodiment, M''' represents a monoatomic cation of an element selected from a group consisting of Si, Ge, Al, Ga, N, P, and As, or any combination of such cations.

In one embodiment, M''' represents a monoatomic cation of an element selected from a group consisting of Si and Ge, or a combination of such cations.

In one embodiment, M''' represents a monoatomic cation of an element selected from a group consisting of Al, Ga, N, P, and As, or any combination of such cations.

In one embodiment, M''' represents a monoatomic cation of an element selected from a group consisting of Al and Ga, or a combination of such cations.

In one embodiment, M''' represents a monoatomic cation of an element selected from a group consisting of N, P, and As, or any combination of such cations.

In one embodiment, M''' represents a monoatomic cation of Zn.

In one embodiment, X represents an anion of an element selected from a group consisting of F, Cl, Br, I, and At, or any combination of such anions. In one embodiment, X represents an anion of an element selected from a group consisting of F, Cl, Br, and I, or any combination of such anions. In one embodiment, X is absent.

In one embodiment, X' represents an anion of an element selected from a group consisting of O, S, Se, and Te, or any combination of such anions. In one embodiment, X' represents an anion of S. In one embodiment X' is absent.

In one embodiment, the luminescent material is doped with at least one transition metal ion. In one embodiment, the luminescent material is represented by formula (I), wherein M'''' represents a cation of an element selected from transition metals of the IUPAC periodic table of the elements, or of Tl, Pb, or Bi, or any combination of such cations. In one embodiment, M'''' represents a cation of an element selected from transition metals of the f-block of the IUPAC periodic table of the elements. In one embodiment, M'''' represents a cation of an element selected from transition metals of the d-block of the IUPAC periodic table of the elements. In one embodiment, M'''' represents a cation of an element selected from a group consisting of Yb, Er, and Eu, or any combination of such cations. In one embodiment, M'''' represents a cation of an element selected from a group consisting of Ti, V, Cr, Mn, Fe, Co, Ni, Cu, and Zn, or any combination of such cations. In one embodiment, M'''' represents a cation of Ti.

In one embodiment, the luminescent material is represented by formula (I), wherein M'''' is absent. In this embodiment, the luminescent material is not doped.

In one embodiment, the luminescent material represented by the formula (I) comprises M'''' in an amount of 0.001-10 mol-%, or 0.001-5 mol-%, or 0.1-5 mol-% based on the total amount of the luminescent material.

In one embodiment, the luminescent material is selected from a group consisting of:
$(Li_xNa_{1-x-y-z}K_yRb_z)_8(Al, Ga)_6Si_6O_{24}(Cl, S)_2$:Ti,
$(Li_xNa_{1-x-y-z}K_yRb_z)_8(Al, Cr)_6Si_6O_{24}(Cl, S)_2$:Ti
$(Li_xNa_{1-x-y-z}K_yRb_z)_8(Al, Mn)_6Si_6O_{24}(Cl, S)_2$:Ti,
$(Li_xNa_{1-x-y-z}K_yRb_z)_8(Al, Fe)_6Si_6O_{24}(Cl, S)_2$:Ti,
$(Li_xNa_{1-x-y-z}K_yRb_z)_8(Al, Co)_6Si_6O_{24}(Cl, S)_2$:Ti,
$(Li_xNa_{1-x-y-z}K_yRb_z)_8(Al, Ni)_6Si_6O_{24}(Cl, S)_2$:Ti,
$(Li_xNa_{1-x-y-z}K_yRb_z)_8(Al, Cu)_6Si_6O_{24}(Cl, S)_2$:Ti,
$(Li_xNa_{1-x-y-z}K_yRb_z)_8(Al, B)_6Si_6O_{24}(Cl, S)_2$:Ti,
$(Li_xNa_{1-x-y-z}K_yRb_z)_8Mn_6Si_6O_{24}(Cl, S)_2$:Ti,
$(Li_xNa_{1-x-y-z}K_yRb_z)_8Cr_6Si_6O_{24}(Cl, S)_2$:Ti,
$(Li_xNa_{1-x-y-z}K_yRb_z)_8Fe_6Si_6O_{24}(Cl, S)_2$:Ti,
$(Li_xNa_{1-x-y-z}K_yRb_z)_8Co_6Si_6O_{24}(Cl, S)_2$:Ti,
$(Li_xNa_{1-x-y-z}K_yRb_z)_8Ni_6Si_6O_{24}(Cl, S)_2$:Ti,
$(Li_xNa_{1-x-y-z}K_yRb_z)_8Cu_6Si_6O_{24}(Cl, S)_2$:Ti,
$(Li_xNa_{1-x-y-z}K_yRb_z)_8B_6Si_6O_{24}(Cl, S)_2$:Ti,
$(Li_xNa_{1-x-y-z}K_yRb_z)_8Ga_6Si_6O_{24}(Cl, S)_2$:Ti,
$(Li_xNa_{1-x-y-z}K_yRb_z)_8Al_6 (Si, Zn)_6O_{24}(Cl, S)_2$:Ti,
$(Li_xNa_{1-x-y-z}K_yRb_z)_8Al_6 (Si, Ge)_6O_{24}(Cl, S)_2$:Ti,
$(Li_xNa_{1-x-y-z}K_yRb_z)_8Al_6Zn_6O_{24}(Cl, S)_2$:Ti,
$(Li_xNa_{1-x-y-z}K_yRb_z)_8Al_6Ge_6O_{24}(Cl, S)_2$:Ti,
$(Li_xNa_{1-x-y-z}K_yRb_z)_8Al_6(Ga, Si, N)_6O_{24}(Cl, S)_2$:Ti,
$(Li_xNa_{1-x-y-z}K_yRb_z)_8Al_6(Ga, Si, As)_6O_{24}(Cl, S)_2$:Ti,
$(Li_xNa_{1-x-y-z}K_yRb_z)_8Al_6(Ga, N)_6O_{24}(Cl, S)_2$:Ti,
$(Li_xNa_{1-x-y-z}K_yRb_z)_8Al_6(Ga, As)_6O_{24}(Cl, S)_2$:Ti,
$(Li_xNa_{1-x-y-z}K_yRb_z)_8(Al, Ga)_6Ge_6O_{24}(Cl, S)_2$:Ti,
$(Li_xNa_{1-x-y-z}K_yRb_z)_8(Al, Cr)_6Ge_6O_{24}(Cl, S)_2$:Ti,
$(Li_xNa_{1-x-y-z}K_yRb_z)_8(Al, Mn)_6Ge_6O_{24}(Cl, S)_2$:Ti,
$(Li_xNa_{1-x-y-z}K_yRb_z)_8(Al, Fe)_6Ge_6O_{24}(Cl, S)_2$:Ti,
$(Li_xNa_{1-x-y-z}K_yRb_z)_8(Al, Co)_6Ge_6O_{24}(Cl, S)_2$:Ti,
$(Li_xNa_{1-x-y-z}K_yRb_z)_8(Al, Ni)_6Ge_6O_{24}(Cl, S)_2$:Ti,
$(Li_xNa_{1-x-y-z}K_yRb_z)_8(Al, Cu)_6Ge_6O_{24}(Cl, S)_2$:Ti,
$(Li_xNa_{1-x-y-z}K_yRb_z)_8(Al, B)_6Ge_6O_{24}(Cl, S)_2$:Ti,
$(Li_xNa_{1-x-y-z}K_yRb_z)_8Mn_6Ge_6O_{24}(Cl, S)_2$:Ti,
$(Li_xNa_{1-x-y-z}K_yRb_z)_8Cr_6Ge_6O_{24}(Cl, S)_2$:Ti,
$(Li_xNa_{1-x-y-z}K_yRb_z)_8Fe_6Ge_6O_{24}(Cl, S)_2$:Ti,
$(Li_xNa_{1-x-y-z}K_yRb_z)_8CO_6Ge_6O_{24}(Cl, S)_2$:Ti,
$(Li_xNa_{1-x-y-z}K_yRb_z)_8Ni_6Ge_6O_{24}(Cl, S)_2$:Ti,
$(Li_xNa_{1-x-y-z}K_yRb_z)_8Cu_6Ge_6O_{24}(Cl, S)_2$:Ti,
$(Li_xNa_{1-x-y-z}K_yRb_z)_8B_6Ge_6O_{24}(Cl, S)_2$:Ti, and
$(Li_xNa_{1-x-y-z}K_yRb_z)_8Ga_6Ge_6O_{24}(Cl, S)_2$:Ti,
wherein
$x+y+z \leq 1$, and
$x \geq 0, y \geq 0, z \geq 0$.

In one embodiment, the luminescent material is selected from a group consisting of $(Li, Na)_8(AlSi)_6O_{24}(Cl, S)_2$:Ti, $(Na, K)_8(AlSi)_6O_{24}(Cl, S)_2$:Ti, $(Na, Rb)_8(AlSi)_6O_{24}(Cl, S)_2$:Ti, $Na_8 (AlSi)_6O_{24}(Cl, S)_2$:Ti, $Na_8 (AlSi)_6O_{24}(Cl, S)_2$:Ti, and $Na_8 (AlSi)_6O_{24}(Cl, S)_2$:Ti.

In one embodiment, the luminescent material is synthesized by a reaction according to Norrbo et al. (Norrbo, I.; Gluchowski, P.; Paturi, P.; Sinkkonen, J.; Lastusaari, M., Persistent Luminescence of Tenebrescent $Na_8Al_6Si_6O_{24}(Cl, S)_2$: Multifunctional Optical Markers. Inorg. Chem. 2015, 54, 7717-7724), which reference is based on Armstrong & Weller (Armstrong, J. A.; Weller, J. A. Structural Observation of Photochromism. Chem. Commun. 2006, 1094-1096). Stoichiometric amounts of Zeolite A and $Na_2SO_4$ as well as LiCl, NaCl, KCl and/or RbCl can be used as the starting materials. The at least one dopant is added as an oxide, such as $TiO_2$. The material can be prepared as follows: Zeolite A is first dried at 500° C. for 1 h. The initial mixture is then heated at 850° C. in air for 48 h. The product is then freely cooled down to room temperature and ground. Finally, the product is re-heated at 850° C. for 2 h under a flowing 12% $H_2$+88% $N_2$ atmosphere. The as-prepared materials are washed with water to remove any excess LiCl/NaCl/KCl/RbCl impurities. The purity can be verified with an X-ray powder diffraction measurement.

The lighting device disclosed in the current specification has the added utility of enabling the adjustment of the color temperature of white light by using a single material emitting white light on exposure to electromagnetic radiation of a preselected wavelength. The lighting device has the added utility of using a single luminescent material, which produces only white light. Thus the lighting device does not use separate red, green or blue dots that would be visible to the human eye. The lighting device has the added utility of having a more pleasing appearance to the user.

It will be understood that the benefits and advantages described above may relate to one embodiment or may relate to several embodiments. The embodiments are not limited to those that solve any or all of the stated problems or those that have any or all of the stated benefits and advantages.

The embodiments of the invention described hereinbefore may be used in any combination with each other. Several of the embodiments may be combined together to form a further embodiment of the invention. A lighting device, or a method, to which the current specification is related, may comprise at least one of the embodiments described hereinbefore.

for adjusting the color temperature of white light emitted by the luminescent material 2 as a result of being subjected to the electromagnetic radiation of a preselected wavelength range. The lighting device 1 illustrated in FIG. 1 further comprises a power unit 5 for producing and/or entering electric current to the metering unit.

Example 1—Preparing Materials

The materials represented by the following formulas were prepared:
$(Li, Na)_8Al_6Si_6O_{24}(Cl, S)_2:Ti^{3+}$,
$Na_8Al_6Si_6O_{24}(Cl_{0.6}, S_{0.15})_2:Ti^{3+}$,
$Na_8Al_6Si_6O_{24}(Cl_{0.8}, S_{0.05})_2:Eu^{3+}, Ti^{3+}$, and
$(Na, Rb)_8Al_6Si_6O_{24}(Cl_{0.8}, S_{0.05})_2:Ti^{3+}$.
The following starting materials were used:

| Material to be prepared | Starting materials | | | | |
|---|---|---|---|---|---|
| $(Li,Na)_8Al_6Si_6O_{24}(Cl,S)_2:Ti^{3+}$ | LiCl | NaCl | Zeolite A | $Na_2SO_4$ | $TiO_2$ |
| $Na_8Al_6Si_6O_{24}(Cl_{0.6},S_{0.15})_2:Ti^{3+}$ | NaCl | Zeolite A | $Na_2SO_4$ | $TiO_2$ | |
| $Na_8Al_6Si_6O_{24}(Cl_{0.8},S_{0.05})_2:Eu^{3+},Ti^{3+}$ | NaCl | Zeolite A | $Na_2SO_4$ | $TiO_2$ | $Eu_2O_3$ |
| $(Na,Rb)_8Al_6Si_6O_{24}(Cl_{0.8},S_{0.05})_2:Ti^{3+}$ | NaCl | RbCl | Zeolite A | $Na_2SO_4$ | $TiO_2$ |

EXAMPLES

Reference will now be made in detail to various embodiments, examples of which are illustrated in the accompanying drawings.

The description below discloses some embodiments in such a detail that a person skilled in the art is able to utilize the embodiments based on the disclosure. Not all steps or features of the embodiments are discussed in detail, as many of the steps or features will be obvious for the person skilled in the art based on this specification.

For reasons of simplicity, item numbers will be maintained in the following exemplary embodiments in the case of repeating components.

FIG. 1 illustrates schematically one embodiment of the lighting device 1 for adjusting the color temperature of white color emitted by luminescent material. The lighting device 1 as illustrated in FIG. 1 comprises a luminescent material 2 configured to emit white light when being exposed to electromagnetic radiation of a preselected wavelength range. The lighting device 1 as illustrated in FIG. 1 further comprises an excitation unit 3a configured to expose the luminescent material to electromagnetic radiation of a first wavelength range selected from the range of 230-330 nm and an excitation unit 3b configured to expose the luminescent material to electromagnetic radiation of a second wavelength range, different from the first wavelength range, selected from the range of 300-600 nm.

The lighting device 1 illustrated in FIG. 1 comprises a blocking material 7 preventing or inhibiting the electromagnetic radiation exposed on the luminescent material from being transferred to the surrounding. The blocking material is situated on the opposite side of the luminescent material 2 compared to the side of the luminescent material 2 that is exposed to the electromagnetic radiation from the excitation units. The lighting device 1 illustrated in FIG. 1 further comprises a transparent material 6 on the side of the luminescent material that is exposed to the electromagnetic radiation.

The lighting device 1 illustrated in FIG. 1 further comprises a metering unit 4 configured to adjust the ratio of the irradiances of electromagnetic radiation of first wavelength range and of electromagnetic radiation of second wavelength range that is exposed on the luminescent material 2

The materials were prepared in the following manner: the starting materials were mixed together in stoichiometric ratios. The mixture was heated at 850° C. in air for 48 h. The product was freely cooled down to room temperature and ground. Finally, the product was re-heated at 850° C. for 2 h under a flowing 12% $H_2$+88% $N_2$ atmosphere.

Example 2—Testing of the Samples of the Materials of Example 1

Figure 2:
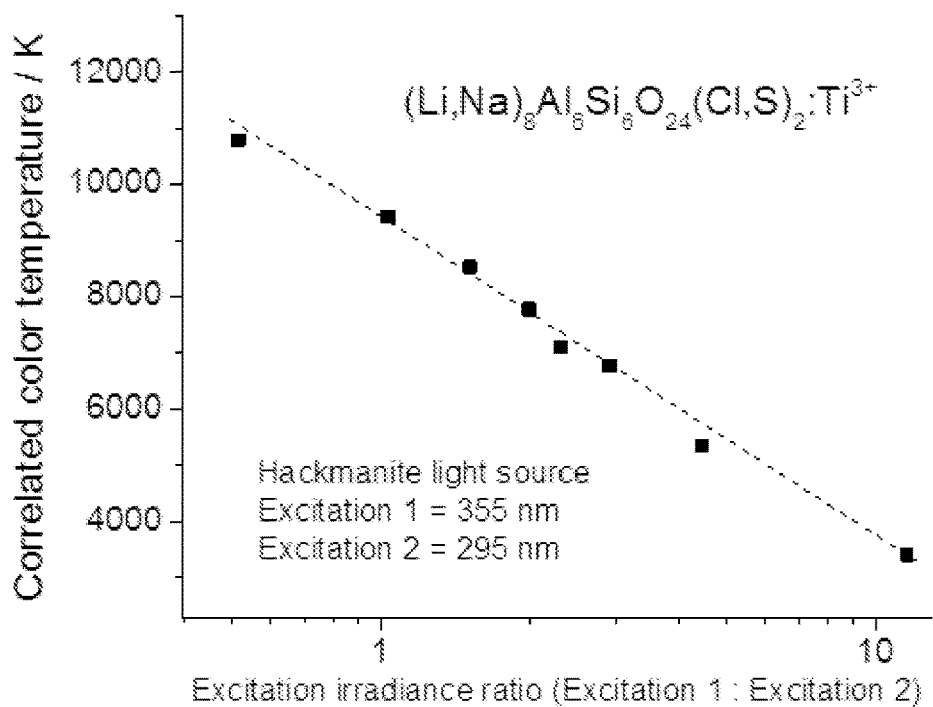
FIGS. 2-5 disclose the test results of example 2.
Figure 3:
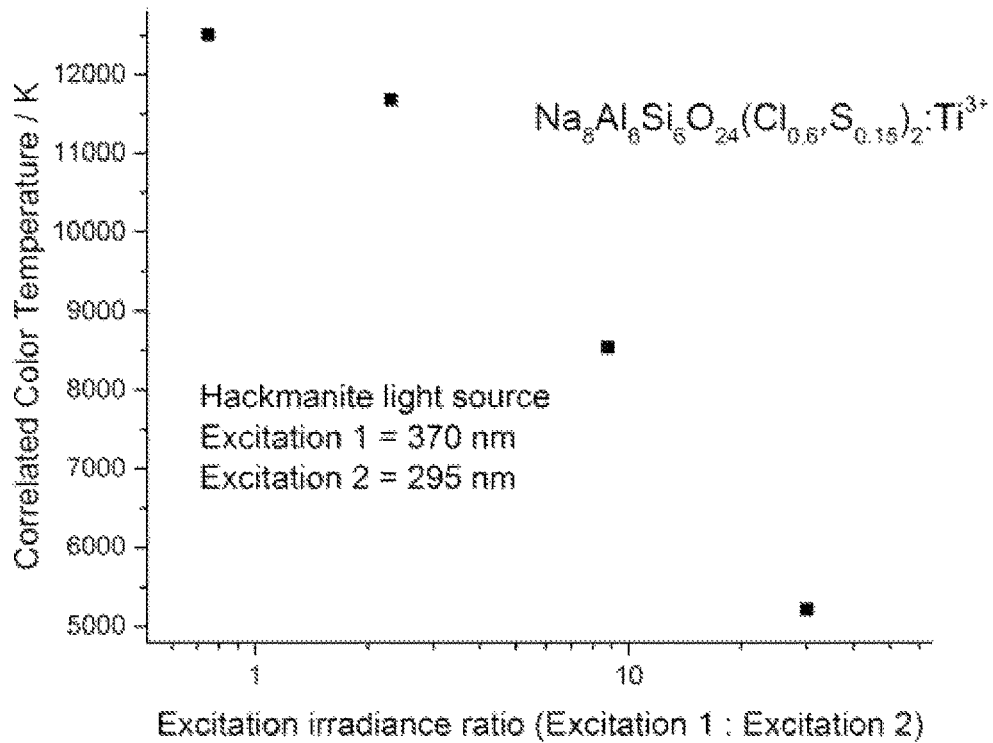
Figure 4:
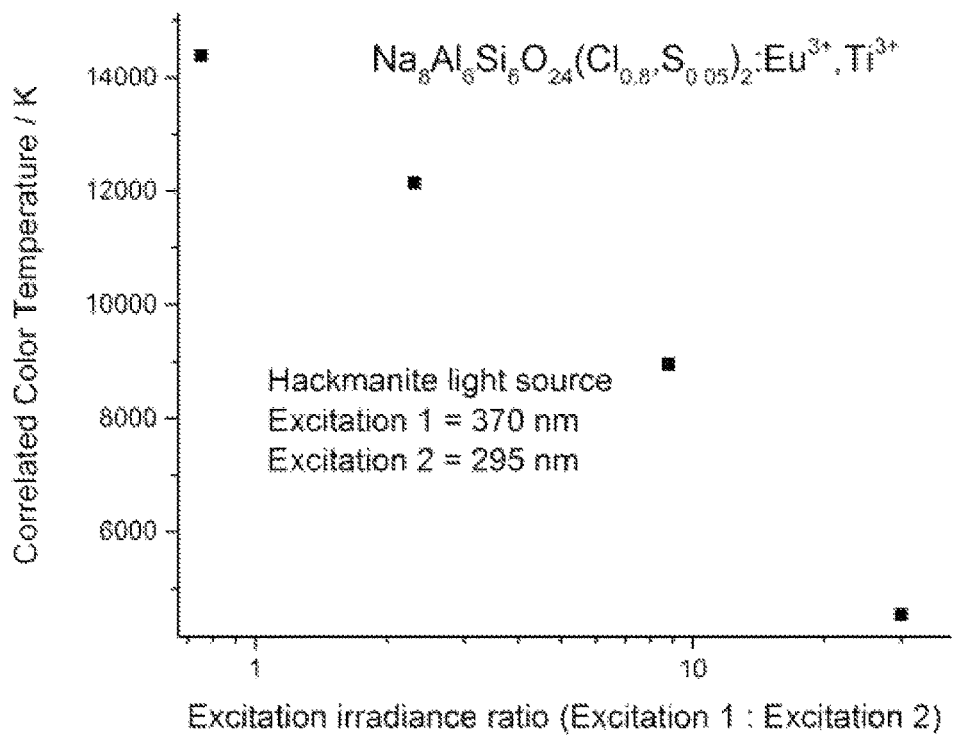
Figure 5:
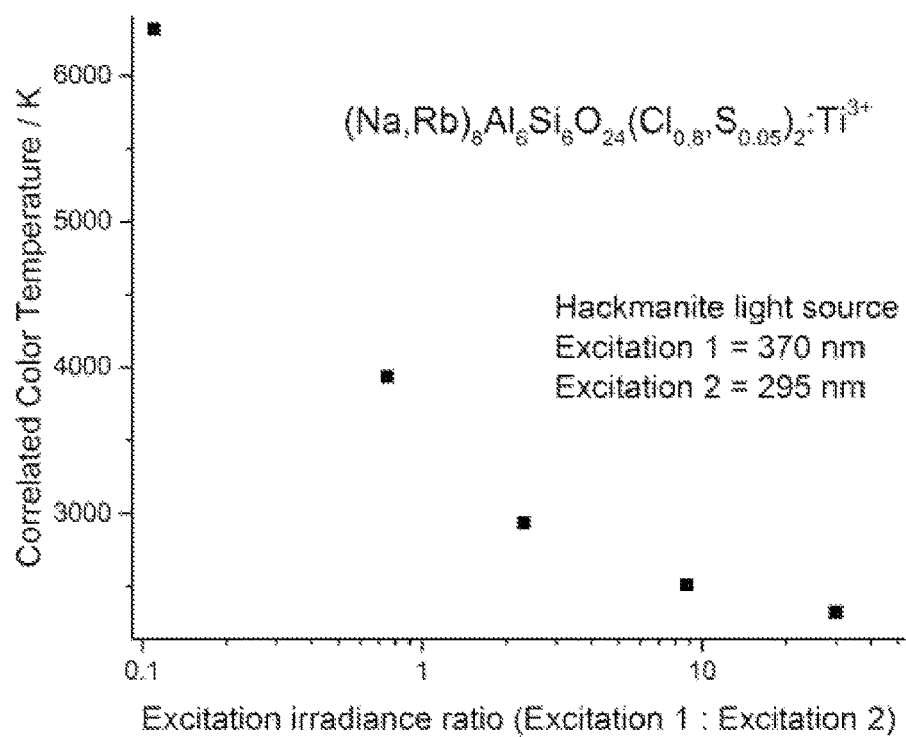

For each sample, a dual output power source was used. Two LEDs were connected to the power source through two current meters. LED 1 operated at 355 nm (example 1, results presented in FIG. 2) or 370 nm (examples 2-4, results presented in FIGS. 3-5). LED 2 operated at 295 nm. The LEDs were fed with currents between 0 and 20 mA, as measured with the current meters. The luminescence of the sample was measured using different ratios of currents for the LEDs. The luminescence spectrum of each example material, under excitation from the two LEDs, was measured with a luminescence spectrometer connected to an optical fiber. The spectra were converted to CCT (correlated color temperature) values using a specialized software (Osram ColorCalculator). The UV radiation intensities of the individual LEDs at each current were measured with an irradiance radiometer.

For the example FIGS. 2, 3, 4 and 5, the CCT is presented as a function of the ratio of the excitation irradiances of the two LEDs.

Example 3—Preparing Different Materials

Following the general description presented in example 1, the following materials were prepared by using the following starting materials:

| Material to be prepared | Starting materials |
|---|---|
| $(Li,Na,K,Rb)_8(AlSi)_6O_{24}(Cl,S)_2:Ti$ | Zeolite A, LiCl, NaCl, KCl, RbCl, $Na_2SO_4$, $TiO_2$ |
| $(Li,Na,K,Rb)_8(AlSi)_6O_{24}(Cl,S)_2:Ti,Eu$ | Zeolite A, LiCl, NaCl, KCl, RbCl, $Na_2SO_4$, $TiO_2$, $Eu_2O_3$ |
| $(Li,Na,K,Rb)_8(AlSi)_6O_{24}(Cl,S)_2:Ti,Bi$ | Zeolite A, LiCl, NaCl, KCl, RbCl, $Na_2SO_4$, $TiO_2$, $Bi_2O_3$ |

-continued

| Material to be prepared | Starting materials |
|---|---|
| $(Li,Na,K,Rb)_8(AlSi)_6O_{24}(Cl,S)_2:Ti,Yb,Er$ | Zeolite A, LiCl, NaCl, KCl, RbCl, $Na_2SO_4$, $TiO_2$, $Yb_2O_3$, $Er_2O_3$ |
| $(Li,Na,K,Rb)_8(AlSi)_6O_{24}(Cl,S)_2:Ti,Cu$ | Zeolite A, LiCl, NaCl, KCl, RbCl, $Na_2SO_4$, $TiO_2$, CuO |
| $(Li,Na,K,Rb)_8(AlSi)_6O_{24}(Cl,S)_2:Ti,Mn$ | Zeolite A, LiCl, NaCl, KCl, RbCl, $Na_2SO_4$, $TiO_2$, MnO |
| $(Li,Na,K,Rb)_8(Al,Ga)_6Si_6O_{24}(Cl,S)_2:Ti$ | Zeolite A, LiCl, NaCl, KCl, RbCl, $Ga_2O_3$, $Na_2SO_4$, $TiO_2$ |
| $(Li,Na,K,Rb)_8(Al,Cr)_6Si_6O_{24}(Cl,S)_2:Ti$ | Zeolite A, LiCl, NaCl, KCl, RbCl, $Cr_2O_3$, $Na_2SO_4$, $TiO_2$ |
| $(Li,Na,K,Rb)_8(Al,Mn)_6Si_6O_{24}(Cl,S)_2:Ti$ | Zeolite A, LiCl, NaCl, KCl, RbCl, MnO $Na_2SO_4$, $TiO_2$ |
| $(Li,Na,K,Rb)_8(Al,Fe)_6Si_6O_{24}(Cl,S)_2:Ti$ | Zeolite A, LiCl, NaCl, KCl, RbCl, FeO, $Na_2SO_4$, $TiO_2$ |
| $(Li,Na,K,Rb)_8(Al,Co)_6Si_6O_{24}(Cl,S)_2:Ti$ | Zeolite A, LiCl, NaCl, KCl, RbCl, CoO, $Na_2SO_4$, $TiO_2$ |
| $(Li,Na,K,Rb)_8(Al,Ni)_6Si_6O_{24}(Cl,S)_2:Ti$ | Zeolite A, LiCl, NaCl, KCl, RbCl, NiO, $Na_2SO_4$, $TiO_2$ |
| $(Li,Na,K,Rb)_8(Al,Cu)_6Si_6O_{24}(Cl,S)_2:Ti$ | Zeolite A, LiCl, NaCl, KCl, RbCl, CuO, $Na_2SO_4$, $TiO_2$ |
| $(Li,Na,K,Rb)_8(Al,B)_6Si_6O_{24}(Cl,S)_2:Ti$ | Zeolite A, LiCl, NaCl, KCl, RbCl, $B_2O_3$, $Na_2SO_4$, $TiO_2$ |
| $(Li,Na,K,Rb)_8Al_6(Si,Zn)_6O_{24}(Cl,S)_2:Ti$ | Zeolite A, LiCl, NaCl, KCl, RbCl, ZnO, $Na_2SO_4$, $TiO_2$ |
| $(Li,Na,K,Rb)_8Al_6(Si,Ge)_6O_{24}(Cl,S)_2:Ti$ | Zeolite A, LiCl, NaCl, KCl, RbCl, $GeO_2$, $Na_2SO_4$, $TiO_2$ |
| $(Li,Na,K,Rb)_8Al_6(Ga,Si)_6O_{24}(Cl,S)_2:Ti$ | Zeolite A, LiCl, NaCl, KCl, RbCl, $Ga_2O_3$, $Na_2SO_4$, $TiO_2$ |
| $(Li,Na,K,Rb)_8Al_6(Si,As)_6O_{24}(Cl,S)_2:Ti$ | Zeolite A, LiCl, NaCl, KCl, RbCl, $As_2O_3$, $Na_2SO_4$, $TiO_2$ |
| $(Li,Na,K,Rb)_8Al_6(Si,N)_6O_{24}(Cl,S)_2:Ti$ | Zeolite A, LiCl, NaCl, KCl, RbCl, NO, $Na_2SO_4$, $TiO_2$ |
| $(Li,Na,K,Rb)_8(AlSi)_6O_{24}(Cl,Br,S)_2:Ti$ | Zeolite A, LiCl, NaCl, KCl, RbCl, NaBr, $Na_2SO_4$, $TiO_2$, |
| $(Li,Na,K,Rb)_8(AlSi)_6O_{24}(Cl,F,S)_2:Ti$ | Zeolite A, LiCl, NaCl, KCl, RbCl, NaF, $Na_2SO_4$, $TiO_2$, |

When tested in a similar manner as above for example 2, it was noted that the above materials could be used as luminescent material when adjusting the color temperature of white light emitted by the luminescent material.

It is obvious to a person skilled in the art that with the advancement of technology, the basic idea may be implemented in various ways. The embodiments are thus not limited to the examples described above; instead, they may vary within the scope of the claims.

The embodiments described hereinbefore may be used in any combination with each other. Several of the embodiments may be combined together to form a further embodiment. A device or a method, disclosed herein, may comprise at least one of the embodiments described hereinbefore. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The term "comprising" is used in this specification to mean including the feature(s) or act(s) followed thereafter, without excluding the presence of one or more additional features or acts.

The invention claimed is:

1. A lighting device for adjusting the color temperature of white light emitted by a luminescent material, wherein the lighting device comprises:
a luminescent material configured to emit white light when being exposed to electromagnetic radiation of a preselected wavelength range;
at least one excitation unit configured to expose the luminescent material to electromagnetic radiation of a first wavelength range selected from the range of 230-330 nm;
at least one excitation unit configured to expose the luminescent material to electromagnetic radiation of a second wavelength range, different from the first wavelength range, selected from the range of 300-600 nm;
a metering unit configured to adjust the ratio of the irradiances of electromagnetic radiation of first wavelength range and of electromagnetic radiation of second wavelength range that is exposed on the luminescent material for adjusting the color temperature of white light emitted by the luminescent material as a result of being subjected to the electromagnetic radiation of the preselected wavelength range;
wherein the luminescent material is represented by the following formula (I)

$$(M')_8(M''M''')_6O_{24}(X,X')_2:M'''' \qquad \text{formula (I)}$$

wherein
M' represents a monoatomic cation of an alkali metal selected from Group 1 of the IUPAC periodic table of the elements, or any combination of such cations;
M'' represents a trivalent monoatomic cation of an element selected from Group 13 of the IUPAC periodic table of the elements, or of a transition element selected from any of Groups 3-12 of the IUPAC periodic table of the elements, or any combination of such cations;
M''' represents a monoatomic cation of an element selected from Group 14 of the IUPAC periodic table of the elements, or of an element selected from any of Groups 13 and 15 of the IUPAC periodic table of the elements, or of Zn, or any combination of such cations;
X represents an anion of an element selected from Group 17 of the IUPAC periodic table of the elements, or any combination of such anions, or wherein X is absent;
X' represents an anion of an element selected from Group 16 of the IUPAC periodic table of the elements, or any combination of such anions, or wherein X' is absent; and
M'''' represents a dopant cation of an element selected from transition metals of the IUPAC periodic table of the elements, or of Tl, Pb, or Bi, or any combination of such cations, or wherein M'''' is absent;
with the proviso that at least one of X and X' is present.

2. The lighting device of claim 1, wherein the difference between the first wavelength range and the second wavelength range is at least 20 nm.

3. The lighting device of claim 1, wherein the electromagnetic radiation of the first wavelength range is selected from the range of 260-320 nm.

4. The lighting device of claim 1, wherein the electromagnetic radiation of the second wavelength range is selected from the range of 330-400 nm.

5. The lighting device of claim 1, wherein the metering unit is configured to adjust the ratio of the irradiances of electromagnetic radiation of first wavelength range and of electromagnetic radiation of second wavelength range that is exposed on the luminescent material by adjusting the amount of electric current fed to the at least one excitation unit configured to expose the luminescent material to electromagnetic radiation of a first wavelength range and to the at least one second excitation unit configured to expose the luminescent material to electromagnetic radiation of a second wavelength range.

6. The lighting device of claim 1, wherein the color temperature of white light emitted by the luminescent material is adjusted within the range of 2000-13000 K.

7. A method for adjusting the color temperature of white light emitted by a luminescent material, wherein the method comprises:
providing a luminescent material represented by the formula (I) as defined in claim 1;
subjecting the luminescent material to electromagnetic radiation with at least one excitation unit exposing the luminescent material to electromagnetic radiation of a first wavelength range selected from the range of 230-330 nm, and with at least one excitation unit exposing the luminescent material to electromagnetic radiation of a second wavelength range, different from the first wavelength range, selected from the range of 300-600 nm,
wherein the ratio of the irradiances of electromagnetic radiation of first wavelength range and of electromagnetic radiation of second wavelength range that is exposed on the luminescent material is adjusted for adjusting the color temperature of white light emitted by the luminescent material as a result of being subjected to the electromagnetic radiation.

8. The method of claim 7, wherein the difference between the first wavelength range and the second wavelength range is at least 20 nm.

9. The method of claim 7, wherein the electromagnetic radiation of the first wavelength range is selected from the range of 260-320 nm.

10. The method of claim 7, wherein the electromagnetic radiation of the second wavelength range is selected from the range of 330-400 nm.

11. The method of claim 7, wherein the method comprises adjusting the ratio of the irradiances of electromagnetic radiation of first wavelength range and of electromagnetic radiation of second wavelength range that is exposed on the luminescent material by adjusting the amount of electric current fed to the at least one excitation unit configured to expose the luminescent material to electromagnetic radiation of a first wavelength range and to the at least one excitation unit configured to expose the luminescent material to electromagnetic radiation of a second wavelength range.

12. The method of claim 7, wherein the color temperature of white light emitted by the luminescent material is adjusted within the range of 2000-13000 K.

* * * * *